Jan. 26, 1943.    D. S. BRUCE ET AL    2,309,571
METHOD OF MAKING FRICTION MATERIALS
Filed Dec. 7, 1940    2 Sheets-Sheet 2

INVENTOR
DONALD S. BRUCE
RALPH T. HALSTEAD
EDWARD B. DOUGLAS
BY Virgil C. Kline
ATTORNEY Patented Jan. 26, 1943

2,309,571

UNITED STATES PATENT OFFICE 2,309,571

METHOD OF MAKING FRICTION MATERIALS

Donald S. Bruce and Ralph T. Halstead, Somerville, and Edward B. Douglas, Warren Township, Somerset County, N. J., assignors to Johns-Manville Corporation, New York, N. Y., a corporation of New York Application December 7, 1940, Serial No. 369,058

7 Claims. (Cl. 18—48)

This invention relates to friction materials and the method of manufacturing the same. It relates especially to friction materials that are suitable for use as clutch facings, brake blocks and brake linings, as well as miscellaneous friction elements for different mechanisms. More specifically the invention relates to an improved molded type friction material in which the production cycle is a continuous process as contrasted to the intermittent processes as heretofore known.

In the previously known methods of manufacturing molded type friction materials, a dry mixture of the ingredients is thoroughly blended and is placed in a suitable heated mold and compressed to the desired shape. If a friction material containing multiple layers of composition were desired, the practice has been to place a layer of the blended composition in the bottom of the mold and then to superimpose thereupon another layer of a suitable composition. The layers were then subjected to high compression and heat to form a unitary product. These procedures are, however, intermittent in operation and tend to increase the cost of the finished product. Another objection to the previous process is that it was practically impossible to obtain uniform thicknesses of the layers and it is difficult to obtain a friction material which would wear uniformly.

It is therefore an object of this invention to manufacture friction materials, especially clutch facings and brake linings, in which the process of manufacturing is a continuous operation. Through the use of the continuous process it is possible to manufacture clutch facings and brake linings within a short period of time after the mixing of the component ingredients. Another object of this invention is to manufacture a multiple layer friction material in which one layer is relatively cheap but sufficiently strong to hold rivets or other fastening means through which the material is fastened to the brake drum. In another layer of the multiple layer product, friction materials are incorporated in the composition which impart friction characteristics to the friction layer. An additional object of this invention is to manufacture friction materials in which very little surface cracking or fissures tend to form during the manufacturing operations. A further object of this invention is to provide a process for making clutch faces and brake linings in which it is possible to have efficient control of the various reactions occurring during the treatment of the sheeted material.

Further objects of this invention will be apparent to those skilled in the art upon a study of the specification and claims as hereinafter presented. Broadly stated, the present invention comprises thoroughly blending a suitable composition in a mixer and then adding water thereto to maintain appreciable segregation of the heavier materials throughout the mix. The thoroughly blended and segregated material is then passed into a fluff box to thoroughly fluff up the material and also to remove any agglomerates or lumps from the composition. The thoroughly fluffed-up material is dropped upon a moving belt and subjected to a deaerating operation in which excess air is removed from the layer. Thereafter the layer is subjected to compression to form a compacted sheet. After the sheet has been cut into units of suitable size substantially all the moisture remaining therein is removed by passing the units through a heating unit. The resulting units are then placed into heated molds and subjected to pressure for consolidation of the structure and to chemically react the binders contained therein.

Figure 1:
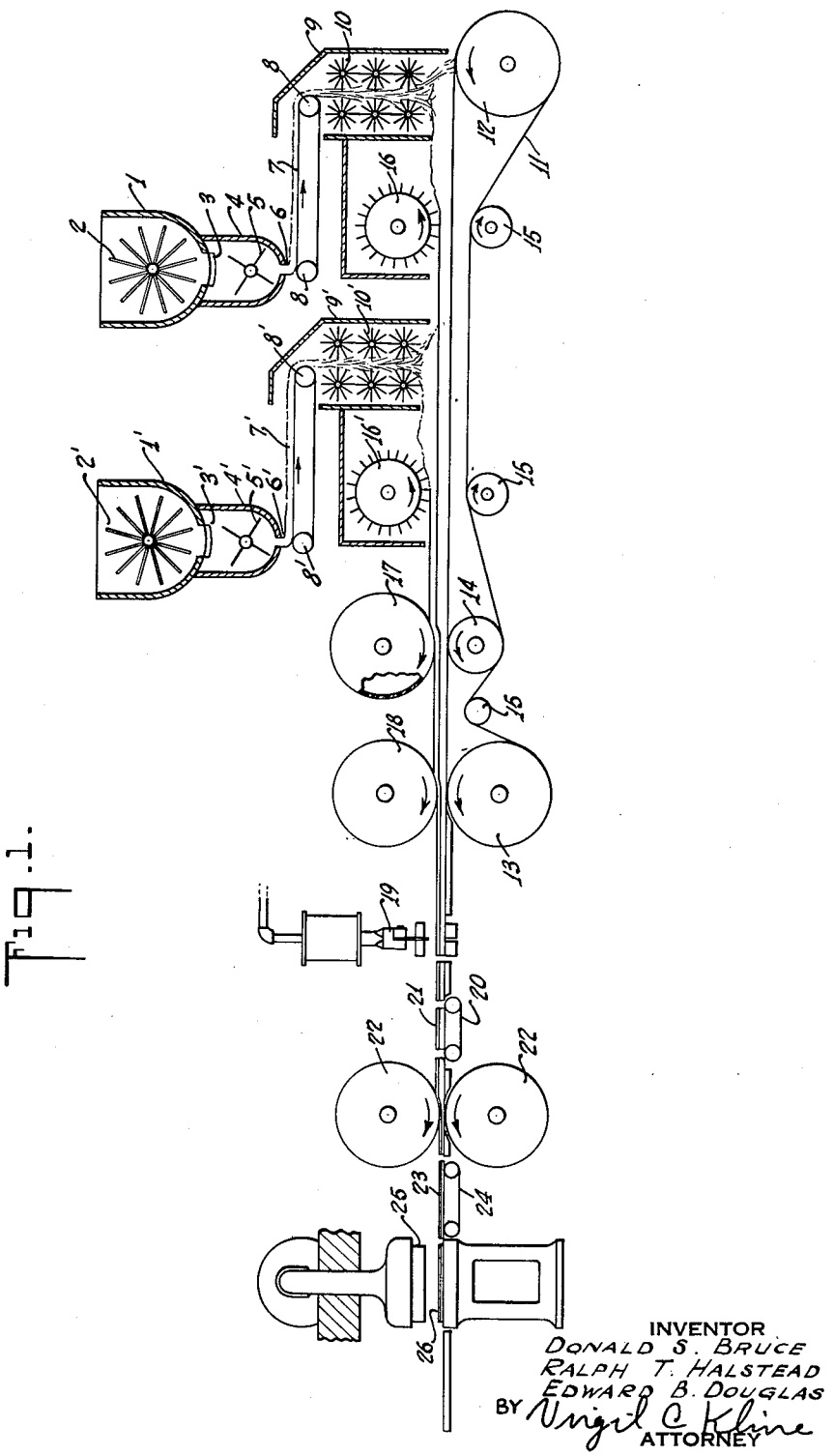
Fig. 1 shows a side view of the apparatus which is used in following the procedure of our invention.

In describing the process of our invention, a preferred embodiment of the invention will be described in conjunction with the attached drawings to which reference is made. In manufacturing clutch facings, the following composition will be satisfactory:

| | Parts |
|---|---|
| Dry powdered phenolic resin | 40 |
| Asbestos fibres | 200 |
| Precured rubber compound friction material | 100 |
| Brass chips | 45 |
| Carbon black | 4 |

The above ingredients are fed to an open mixer 1 which has rotating paddle blades 2 therein and the mixture is thoroughly blended for several minutes until uniform distribution of the components in the composition has been obtained. After thorough dry mixing of this composition, water, in the amount of about 10% based on the total weight of the blended mixture, is sprayed into the mixer. It is preferable that the water be added thereto in the form of a fine mist in order that satisfactory distribution of the water throughout the mix will be obtained. Blending of the composition and the water in the mixer is continued only long enough for the dry composition to absorb the quantity of water which has been introduced to form a damp mixture.

The dampened stock material is then dropped through a trap 3 into an agitated storage mixer 4. It is desirable to have rotating paddle blades 5 in the storage bin 4 in order to maintain the damp composition in a loose granular form. The thoroughly agitated and dampened composition is then fed through a door 6 in regulated quantities to a traveling conveyor 7 which rotates on the carrying rolls 8. The conveyor carries the material to a fluff box 9 which has rapidly rotating spiked rolls 10 within the box. The fluff box 9 which is used as one of the processing steps in my invention is described in the application of G. B. Brown, Serial No. 186,793, filed January 25, 1938. The rapidly rotating spiked rolls tend to fluff the material and remove any large lumps and agglomerates therefrom.

The thoroughly fluffed material drops to a moving felting belt 11 which is supported by the carrying rolls 12 and 13. The belt 11 is kept in a relatively taut condition by means of the tensioning rolls 15. As the material moves forward on the felting member 11 the picking roll 16 levels off the surface of the deposited composition to a uniform layer. The uniform layer is then subjected to a light compressing action between rolls 14 and 17. Roll 17 is preferably perforated and will thereby permit some of the air contained in the layer to pass or permeate through the openings in the roll. The perforated roll thus serves to impart the initial compacting action to the deposited damp layer as well as to remove excess air therefrom. The partially consolidated layer is now subjected to additional pressure between the rolls 18 and 13. At this point the consolidated material is sufficiently strong for passage to the next operation without the aid of the carrying belt 11. The consolidated sheet is then cut to the proper length by means of a cutting knife 19 which is positioned transverse to the forward movement of the sheet or across the sheet. It is essential that the consolidated sheet be cut to proper lengths 21 so that the slabs 21 may be subjected to additional pressure. If the sheet were not cut transversely as illustrated in the drawing, the compressing rolls 22, which are applied in the next operation, would tend to buckle the sheet due to the stretching out of the consolidated sheet between the rolls.

The slabs 21 are carried on conveyor 20 to the next compressing operation between compressing rolls 22. In this operation sufficient pressure is applied to the dampened slabs to form a handleable slab. The slab 21 has now been stretched out forming a slab 23 which is of greater length than the slab 21, due to the pressing operation between the rolls 22. A conveyor 24 then carries the elongated slabs 23 beneath the cutter 25 and the cutter cuts the elongated slabs 23 into smaller units 26. This latter cutting is made at substantially right angles to the cutting beneath the cutter 19.

Figure 2:
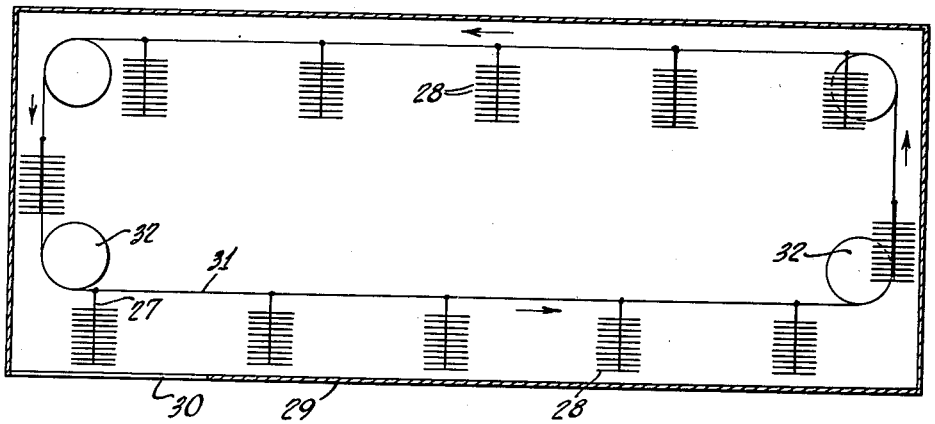
Fig. 2 shows a drying oven in which the prepared units are subjected to heat to remove the moisture contained therein.
Figure 3:
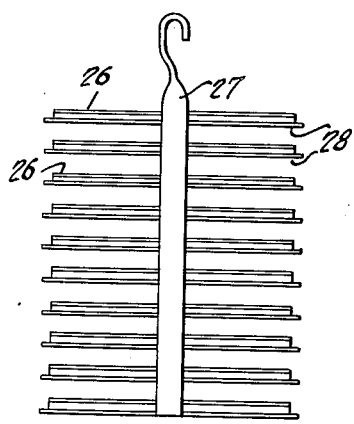
Fig. 3 shows a view of the trays on which the prepared units are placed before passage through the drying oven, and Fig. 4 discloses a view of a mechanism suitable to impart a curvature to the dried units.
Figure 4:
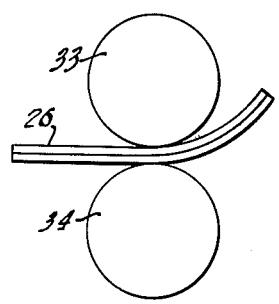

These units are then placed upon a carrier 27 which has trays 28 fastened thereto. The carrier 27 is placed in an oven 29 as illustrated in Fig. 2. The oven is heated sufficiently high to remove by evaporation the mechanically occluded water in the mixture. It is essential that the temperature should not be so high, however, that the water which is combined chemically with the various components is removed. The heating action should only be sufficiently high to create ideal evaporating conditions for the water as for example, temperatures in the order of 140° F. The carrier 27 is placed within the oven through the opening 30 and hooked to a belt 31 which rotates within the drying oven 29 on rolls 32. After the water has been evaporated from the damp and compressed units the units are placed in a conventional mold and subjected to heat and pressure thereby forming a consolidated friction material suitable for clutch facings. This material is also suitable for brake bands after being subjected to the curving action hereinafter described.

In manufacturing a two layer composition suitable for brake linings or the like, mixtures of different compositions are preferably used. It is possible to manufacture multiple layer brake linings through the use of two or more mixing and fluff box units as illustrated in Fig. 1. In manufacturing brake bands, the friction composition layer may be the same as the composition used in manufacturing clutch face disks as described above. The backing material layer which may be mixed in mixer 1' may contain the following composition:

| | Parts |
|---|---|
| Dry powdered phenolic resin | 60 |
| Short asbestos | 330 |
| Carbon black | 10 |

A composition as described is placed in the mixer 1' and subjected to a thorough blending operation by means of the mixing blades 2' rotated in the mixer. After thoroughly dry mixing the composition, water in the amount of about 10% based on the dry weight of the blended composition is added to the mixed materials. The mixing operation is then continued until the added water has been absorbed by the blended mixture thus forming a damp composition. After thorough blending, the damp composition is dropped through a trap door 3' into the storage bin or mixer 4'. As described in connection with the description above, it is also desirable to keep the blended and dampened backing composition thoroughly agitated by means of the rotating blades 5'. The agitated backing composition is fed through a trap door 6' to a conveyor 7' which rotates on the conveyor rolls 8' as illustrated. The conveyor 7' carries the material to the fluff box 9' which has rapidly rotating spike rolls 10' therein.

The composition which is deposited from the fluff box 9' is deposited on or superimposed upon the composition deposited from the fluff box 9. In this case when the deposited compositions reach the primary press roll 17 the product on the conveyor 11 includes two layers, each being substantially of uniform thickness and of different proportioned ingredients. The multiple layer product is then subjected to the same processing operations as described above in connection with the manufacture of clutch facings.

When the multiple layer product 26 is removed from the drying oven 29 the product is passed between a curving mechanism including rolls 33 and 34 which tends to impart any desired curvature to the compacted laminated product without cracking or forming surface fissures in the product. After the proper curvature has been imparted to the compressed units 26 the curved product is placed in conventional molds and subjected to heat and pressure. During the molding operation the dry powdered resinous binders will fuse to form an integral structure.

In manufacturing multiple layer friction materials, it is desirable that the binders in the various layers have similar characteristics so that a substantially perfect union of the materials at the interface between the layers is accomplished during the hot pressing and molding operation. Preferably, the same binder should be used in each layer but different binders may be used in each layer if the several binders have similar characteristics.

The water which is added during the initial blending operations in the mixers 1 and 1' is very essential in connection with the process in this invention. The water tends to impart sufficient density to the blended composition so that when the blended material passes through the various equipment in the process there will be substantially no segregation of the heavier materials. If no water is used the heavier components such as the brass chips and the asbestos fibres tend to sink to the bottom of the mixture with the result that there will be no uniform distribution of these essential components throughout the composition. In addition to the function of preventing segregation of the components, the water serves to some extent as a primary binder which renders the composition sufficiently plastic so that consolidation under the press rolls is possible. Another important function of the water is that it has a sintering effect on certain types of powdered resins which are used as the binder in the composition. The sintering effect occurs during the drying operation in the oven 29 and tends to give the dried product a substantial degree of rigidity thus rendering the material handleable for subsequent operations. This sintering effect is probably due to the fact that the resinous binders may possibly include a small proportion of water soluble constituents and in drying, during the heating operation, the water is driven off and the soluble portion of the resin tends to form a crust and will give a slight bonding action. This bonding action imparts a substantial degree of rigidity to the shaped product. The rigidity imparted to the dried product enables the operator to handle the units during the molding operation without damage to the compressed but unreacted product.

In the above description specific examples of friction surface material and also backing materials have been given but these compositions as well as the proportions used in the compositions may be varied over a wide range without departing from the scope of the present invention.

We claim:

1. The method of manufacturing friction material sheets which comprises dry mixing a composition including asbestos fibres, powdered thermosetting phenolic resins and friction material to thoroughly blend the components, then adding water in amount sufficient to dampen the mixture and continuing the mixing until the water is absorbed by the blended mixture, subjecting the damp mixture to a fluffing operation, depositing the fluffed mixture in a layer on a felting member, approximately levelling the upper surface of the layer, pressing against said layer a member permeable to air and removing excess air from the layer and then consolidating the layer under pressure into a compacted sheet.

2. The method of manufacturing friction material slabs which comprises dry mixing a composition including asbestos fibres, powdered thermosetting phenolic resins and friction material to thoroughly blend the components, then adding water in amount approximating 10% by weight of the mixture and continuing the mixing until the water is absorbed by the blended mixture, subjecting the damp mixture to a fluffing operation, depositing the fluffed mixture in a layer on a felting moving conveyor, and while advancing the layer approximately levelling the upper surface of the layer, pressing against said layer a member permeable to air and removing excess air from the layer and then consolidating the layer under pressure into a compacted sheet, thereafter dividing the compacted sheet into slabs in a direction transverse to the compacted sheet and drying, strongly compressing and heat curing the formed slabs.

3. The method of manufacturing friction units which comprises dry mixing a composition including asbestos fibres, powdered thermosetting phenol-aldehyde resins and friction material to thoroughly blend the components, then adding water in amount approximating 10% by weight of the mixture and continuing the mixing until the water is absorbed by the blended mixture, subjecting the damp mixture to a fluffing operation, depositing the fluffed mixture in a layer on a felting moving conveyor, and while advancing the layer approximately levelling the upper surface of the layer, pressing against said layer a member permeable to air and removing excess air from the layer and then consolidating the layer under pressure into a compact sheet, thereafter dividing the compacted sheet into slabs and strongly compressing the formed slabs, dividing the compressed slabs into smaller units, passing the compressed units through a drying atmosphere to evaporate uncombined water, and finally subjecting the dried units to heat and pressure to condense the resinous components and consolidate the structure.

4. The continuous method of manufacturing friction units which comprises dry mixing a composition including asbestos fibres and powdered thermo-setting phenolic resin to thoroughly blend the components, then adding water in amount approximating 10% by weight of the dry mixture and continuing the mixing until the water is absorbed by the blended mixture, subjecting the damp mixture to a fluffing operation, depositing the fluffed mixture in a layer on a felting moving conveyor, and advancing the layer while approximately levelling the surface of the layer, removing excess air from the layer and then consolidating the layer under pressure into a compacted sheet, thereafter dividing the sheet into slabs and compressing the formed slabs, dividing the compressed slabs into smaller units, passing the compressed units through a drying atmosphere to evaporate uncombined water, subjecting the dried units to a rolling action to create a curvature in the dried unit, and finally consolidating the dried curved units under heat and pressure.

5. The continuous method of manufacturing multiple layer friction units which comprises dry mixing a composition including asbestos fibres, friction particles, and powdered thermo-setting phenolic resin to thoroughly blend the components, then adding water in amount sufficient to dampen the mixture and continuing the mixing until the water is absorbed by the blended mixture, subjecting the damp mixture to a fluffing operation and depositing the fluffed mixture in a layer upon a felting conveyor; dry mixing a second composition consisting chiefly of asbestos fibres and thermosetting phenolic resin to thoroughly blend the components, then adding water and continuing the mixing until the water is absorbed by the blended mixture, subjecting the damp mixture to a fluffing operation and depositing the fluffed mixture in a layer upon the first deposited layer on the felting moving conveyor, and while advancing the thus-superposed layers, removing excess air from the deposited layers and then consolidating the layers into a compacted sheet, thereafter dividing the sheet into slabs and strongly compressing the formed slabs, dividing the compressed slabs into smaller units, passing the compressed units through a drying atmosphere, subjecting the dried units to a rolling action to create a curvature in the dried unit, and finally consolidating the dried curved unit under heat and pressure.

6. The improvement in the process of manufacturing a heat and pressure cured sheet of asbestos fibre bonded with thermo-setting phenolic resin which comprises, forming a dry mixture of the asbestos fibres and powdered fusible resin, and dampening the mixture with water as a preliminary step before sheeting out the stock and densifying and heat curing the formed sheets.

7. The improvement in the process of manufacturing a heat and pressure cured friction sheet of asbestos fibre and friction particles bonded with thermo-setting phenolic resin which comprises, forming a dry mixture of the asbestos fibres, friction particles, and powdered heat-fusible resin, dampening the mixture with approximately 10% by weight of water, forming a sheet containing the components of the stock uniformly distributed therethrough, densifying the sheet by application of pressure, and drying the sheet at a moderate temperature not substantially exceeding 140° F. to eliminate uncombined water and to develop a preliminary bond prior to subjecting the sheet to a final pressure and heat curing treatment.

DONALD S. BRUCE.
RALPH T. HALSTEAD.
EDWARD B. DOUGLAS.